No. 690,577. Patented Jan. 7, 1902.
K. HIMROD, J. R. TUCKER & C. C. HINCKLEY.
SELECTOR.
(Application filed Mar. 10, 1899.)

(No Model.) 6 Sheets—Sheet 1.

Fig. 1

No. 690,577. Patented Jan. 7, 1902.
K. HIMROD, J. R. TUCKER & C. C. HINCKLEY.
SELECTOR.
(Application filed Mar. 10, 1899.)

(No Model.) 6 Sheets—Sheet 2.

Fig. 2

Witnesses:

Inventors

No. 690,577. Patented Jan. 7, 1902.
K. HIMROD, J. R. TUCKER & C. C. HINCKLEY.
SELECTOR.
(Application filed Mar. 10, 1899.)
(No Model.) 6 Sheets—Sheet 3.

No. 690,577. Patented Jan. 7, 1902.
K. HIMROD, J. R. TUCKER & C. C. HINCKLEY.
SELECTOR.
(Application filed Mar. 10, 1899.)
(No Model.) 6 Sheets—Sheet 4.

No. 690,577. Patented Jan. 7, 1902.
K. HIMROD, J. R. TUCKER & C. C. HINCKLEY.
SELECTOR.
(Application filed Mar. 10, 1899.)
(No Model.) 6 Sheets—Sheet 5.

Witnesses:

Inventors

No. 690,577. Patented Jan. 7, 1902.
K. HIMROD, J. R. TUCKER & C. C. HINCKLEY.
SELECTOR.
(Application filed Mar. 10, 1899.)
(No Model.) 6 Sheets—Sheet 6.

Fig. 12

UNITED STATES PATENT OFFICE.

KIRK HIMROD, OF CHICAGO, AND JOHN R. TUCKER AND CHARLES C. HINCKLEY, OF AURORA, ILLINOIS, ASSIGNORS TO THE INTERNATIONAL TYPAL TELEGRAPH COMPANY, OF DETROIT, MICHIGAN, A CORPORATION OF MICHIGAN.

SELECTOR.

SPECIFICATION forming part of Letters Patent No. 690,577, dated January 7, 1902.

Application filed March 10, 1899. Serial No. 708,599. (No model.)

*To all whom it may concern:*

Be it known that we, KIRK HIMROD, of Chicago, in the county of Cook, and JOHN R. TUCKER and CHARLES C. HINCKLEY, of Aurora, in the county of Kane, State of Illinois, citizens of the United States, have invented a certain new and useful Improvement in Selectors, of which the following is a specification.

Our invention relates to various new and useful improvements in selectors.

Our improved selector is especially designed for use in connection with printing-telegraph apparatus, and particularly apparatus for this purpose employing the system suggested by Baudot, wherein there are transmitted for each character over a single line a series of electrical impulses of substantially equal duration, (five or more,) some of one polarity and some of the other polarity, each character being distinguished from all the other characters by a particular permutation of the impulses, and wherein these impulses act upon a selecting mechanism at the receiving end of the line and so adjust it as to cause the operation of the printing mechanism to print the particular character. When used with a printing-telegraph system of the Baudot type, the selector will be located between the receiving apparatus and preferably a distributer, the latter being unaffected by impulses of one polarity, but distributing local currents to the selector when affected by impulses of the opposite polarity, whereby the particular selector-magnets corresponding to the desired permutation of the signal will be actuated.

In an application for Letters Patent filed on even date herewith we have described and claimed certain improvements in relay-distributers which are well adapted for use in combination with our improved selector. The improved selector may, however, be operated by any other construction of distributer, or a distributer may be dispensed with if there is a single line-wire for each selector-magnet, as has also been suggested.

While our invention is adapted for use in connection with printing-telegraph apparatus, it can be employed in connection with other devices which it may be desired to control from a distance. With five character impulses the selector will employ five selector-magnets, and it will become possible to secure thirty-two distinct combinations for the control of a corresponding number of individual devices, such as the printing-magnets of a telegraph-receiver, the elements of a torpedo, of a type-setting machine, or of any other apparatus.

The essential object of our invention is to simplify the construction and improve the efficiency of a selector. To this end we employ thirty-two selector-plates, (assuming that there are five selector-magnets,) which plates will be arranged circumferentially with respect to a selector-shaft carrying an arm having a brush adapted to make contact with any one of said selector-plates. The selector-shaft is placed under stress, but is locked from rotation by means of locking devices controlled by the selector-magnets. When the first selector-magnet is energized to operate its lock, the selector-shaft will be allowed to turn, moving the brush a space of sixteen plates. The energization of the second selector-magnet allows the brush to move eight plates, that of the third selector-magnet four plates, that of the fourth selector-magnet two plates, and that of the fifth selector-magnet one plate. By energizing any one or combination of the selector-magnets it will thus become possible to permit the shifting of the selector-shaft to carry the brush into engagement with any one of the selector-plates. For example, assuming the brush to normally rest upon the first plate and it being desired to move it to the twenty-seventh plate, this movement will be brought about by the energization of the first, second, and fourth selector-magnets. The selector-magnets are arranged radially with respect to the selector-shaft, and all the main parts are inclosed in a suitable (preferably cylindrical) casing, whereby we secure a very compact, simple, and effective device.

Another object of our invention is to improve the operation, by means of a selector, of a printing-telegraph receiver or any other desired controlled device, to effect which we arrange a selector having a series of thirty-two plates, (when five selector-magnets are employed,) any one of which is adapted to be engaged by a brush carried on the selector-arm and arranged to close a local circuit to accomplish the desired result—such, for example, as the operation of a key-magnet in the receiver. The closing of this circuit is effected in any suitable way, but preferably from a distributer. We are therefore enabled to effect the control of a printing-telegraph receiver or other device and at the same time to employ a minimum number of breaks in the controlling-circuits.

A further object of the invention is to increase the speed of operation of a selector, which result we secure in part by operating the selector-arm by a spring placed under tension during the resetting or restoring operation.

A further object of the invention is the provision of improved means for restoring or returning the selector-arm after the printing or controlling circuit has been operated. To effect this, we provide the selector-shaft with a normally disengaged friction-clutch connected with a suitable source of power, such as an electric motor, but adapted to be actively connected to the selector-shaft by the energization of a restoring-magnet operated, preferably, from the distributer.

A further object of the invention is to provide improved connections between the selector-shaft and the selector-magnets for permitting the graduated movements of the selector-shaft necessary for the selection of any particular one of thirty-two plates. For this purpose we employ on the selector-shaft a series of six disks, the upper one being connected to the shaft and the lower one to a stationary abutment. Each of the five upper disks carries a detent normally engaging a recess in the adjacent disk, which detents are adapted to be operated to disengage them from the said recesses by the energization of the respective selector-magnets. The adjacent disks also carry stops on their contiguous surfaces which permit them to rotate relatively when released by the operation of the detent to an extent dependent upon the particular disk. When the detent for the upper disk is released, the said disk, carrying the shaft with it, will be rotated to an extent equal to sixteen selector-plates, &c. Since all the disks will be normally locked together, it will be possible to operate the detent of any one of the disks to secure a movement of the selector-shaft corresponding to the particular selector-magnet energized. This particular locking mechanism which we have invented is very simple in its construction, may be operated with great rapidity, since the only load imposed on the selector-magnets is the elevation of the respective detents, and is very durable in character.

In order that our invention may be better understood, attention is directed to the accompanying drawings, forming a part of this specification, and in which—

In all of the above views corresponding parts are represented by the same numerals of reference.

201 represents a base having the vertical standards 202, to which a top plate 203 is secured. A cylindrical casing 204 is preferably located between the top plate and base for inclosing the selector-magnets, disks, &c. 205 are oiling-tubes leading to the interior. The base 201 is formed with a central support 206, and mounted in said support and in the top plate 203 is a selector-shaft 207. The selector-shaft carries an arm 208 at its upper end, and the said arm carries a brush 209 in the slotted head 210, in which is located a spring 211 for pressing the brush 209 into contact with the selector-plates 212 and the collecting-ring 213. The selector-plates 212 (of which there are 32) and the collecting-ring 213 are carried by the insulated disk 214, secured to the top plate 203.

215 is a spring-barrel secured against rotation to the top plate 203, and located in the said barrel is a spring 216, connecting the barrel with the selector-shaft. The spring 216 is normally maintained under tension and tends to sweep the brush 209 over all the selector-plates.

The selector-arm 208 is insulated from the selector-shaft by a bushing 217 and is held in place by the expanding-screw 218, which forces the split ends of the selector-shaft into engagement with the insulating-bushing.

The lower end of the selector-shaft carries one element 219 of a friction-clutch, the other element 220 of said clutch being carried on the upper end of a restoring-shaft 221. The latter shaft is mounted at its lower end in a bearing formed in a bracket 222 and is driven from any suitable source of power—as, for example, by a belt 223, engaging the belt-wheel 224. We show a steel ball 225 between the elements of the friction-clutch and which serves to limit the relative engaging movement thereof to prevent the possibility of the friction-clutch becoming jammed in operation. The restoring-shaft 221 is elevated to engage the elements of the friction-clutch together when it is desired to restore the selector-arm. We therefore employ a restoring-magnet 226, the armature-lever 227 of which is borne upon by a steel ball 228, mounted in a recess in the lower end of the restoring-shaft. This makes a very durable antifriction-bearing. Retracted movement of the armature-lever 227 is limited by a stop 229.

Figure 1:
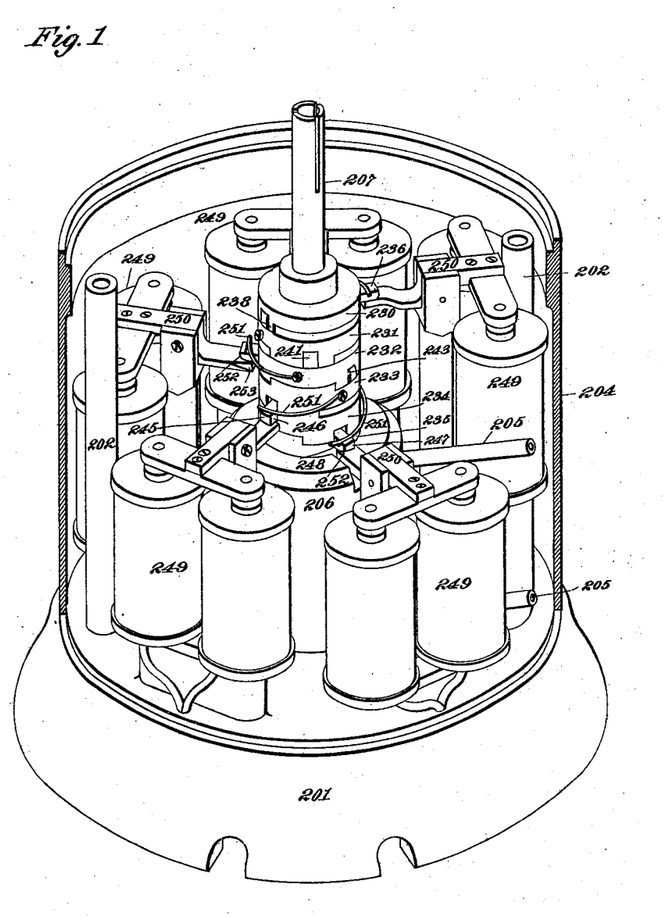
Figure 1 represents a section through the casing of the selector, showing the selector-shaft, disks, and selector-magnets in perspective.
Figure 2:
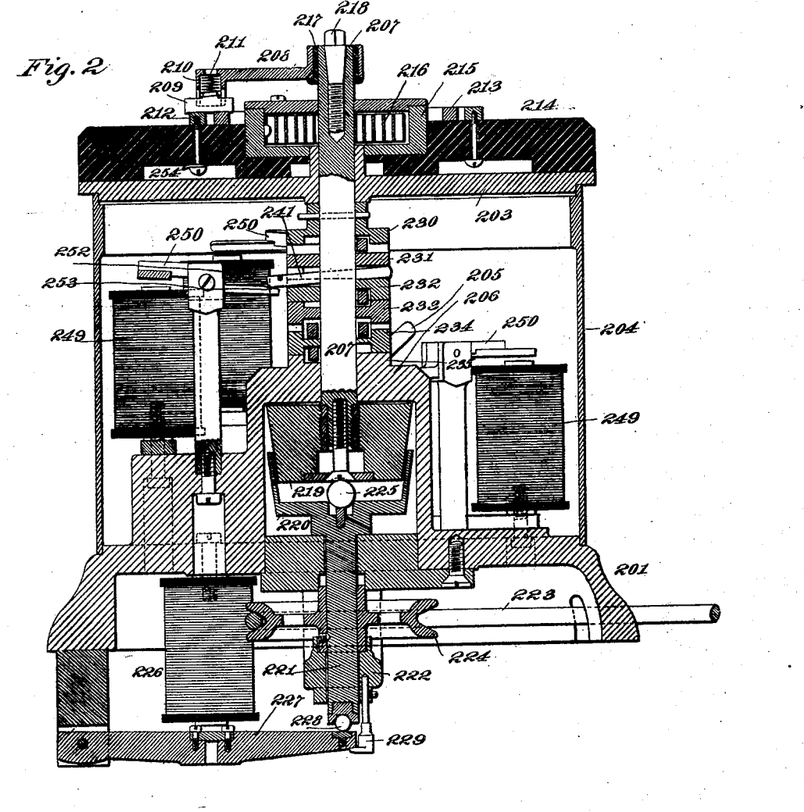
Fig. 2, a vertical sectional view through the selector.
Figure 3:
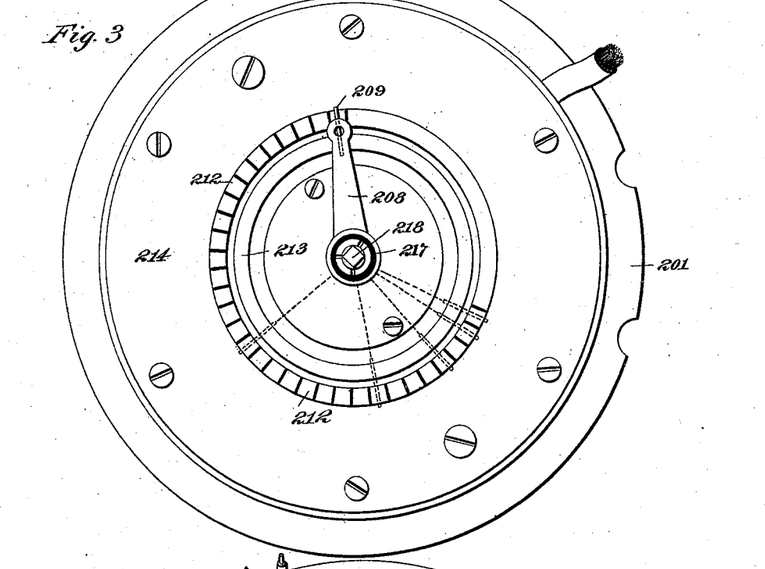
Fig. 3, a plan view of the selector, showing the selector-plates and selector-arm.
Figure 4:
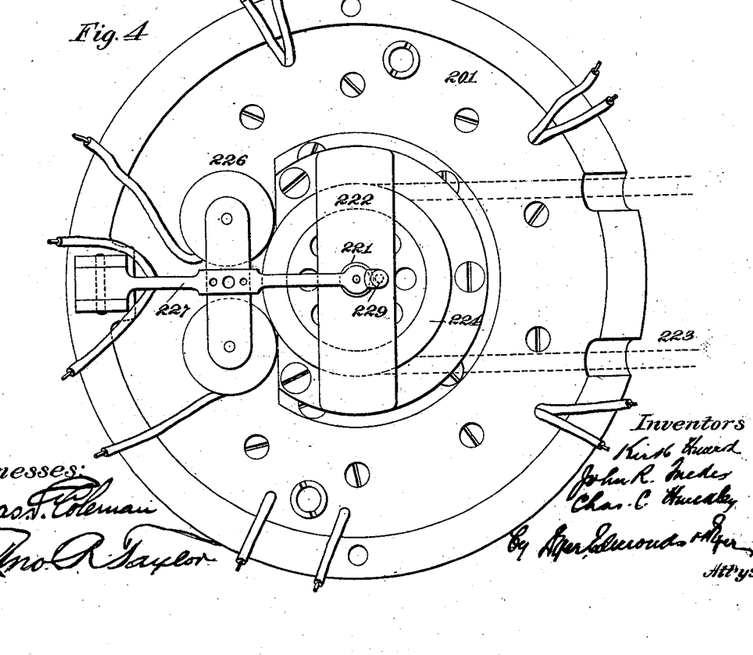
Fig. 4, a bottom view of the selector, showing the restoring-magnet and the operating-pulley.
Figure 5:
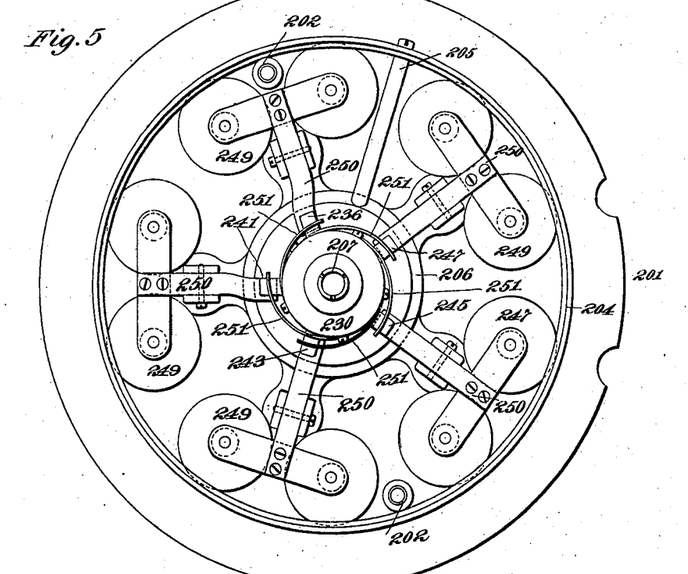
Fig. 5, a plan of the interior of the selector, showing the selector-magnets, disks, and selector-shaft.

It will be observed that when the magnet 226 is energized, assuming the restoring-shaft to be constantly rotating, the elements of the friction-clutch will be engaged together, turning the selector-shaft against the tension of the spring 216. The selector-shaft carries six disks between the standard 206 and the top plate 203. These disks, starting from the top, are numbered, respectively, 230, 231, 232, 233, 234, and 235. The top disk 230 is pinned to the selector-shaft, as shown, and the bottom disk 235 is secured to or made integral with the top of the standard 206. These disks are engaged together, one on top of the other. The disk 230 carries a projecting detent 236, having a bend at its center to clear the selector-shaft and working between lugs 237 237 and 238 238. The forward end of this detent normally rests in a recess 239, so as to lock the disk 230 to the disk 231. When the detent 236 is elevated at its forward end, it will be lifted out of the recess 239, allowing the disk (and the selector-shaft also, since the two are connected together,) to turn with respect to the disk 231 until one of the lugs 237 and one of the lugs 238 engage the lugs 240 240 on the disk 231. These interengaging lugs are so disposed as to allow the disks 230 and 231 to be moved relatively to each other to an extent equal to sixteen selector-plates. The disk 231 carries on its under surface a corresponding projecting detent 241, engaging a recess 242 in the upper surface of the disk 232, these disks being provided with interengaging lugs so disposed relatively to the recess 242 as to allow the disks 231 and 232 to be moved relatively to each other when released to an extent equal to eight selector-plates. The under surface of the disk 232 carries a projecting detent 243, which engages a recess 244 in the upper surface of the disk 233, these disks being also provided with interengaging lugs, allowing a relative movement of the two disks to an extent equal to four selector-plates. The disk 233 carries on its under surface a projecting detent 245, engaging a recess 246 in the disk 234, said disks being provided with interengaging lugs, permitting a relative motion thereof equal to two selector-plates. The disk 234 is provided on its under surface with a projecting detent 247, engaging a recess 248 in the disk 235, said disks being also provided with interengaging lugs, permitting a relative movement thereof equal to one selector-plate. The relative movements of the selector-shaft allowed by the successive operation of all the detents above referred to are illustrated by the dotted lines in Fig. 3. Normally the several detents will be in engagement with their respective recesses, so that the disks will be all locked together, and since the upper disk is connected to the shaft and the lower disk to a stationary abutment the shaft will be locked against rotation with the spring 216 under tension and the brush 209 resting on the first selector-plate. If the detent 236 is lifted to be disengaged from the recess 239, the spring 216 will immediately turn the shaft to an extent equal to sixteen plates. If, for instance, the detent 247 of the disk 234 is now elevated, the spring 216 will turn the selector-shaft an extent equal to an additional plate. It thus becomes possible by operating any one or more of the detents to secure any desired movement of the selector-shaft and to bring the brush 209 into contact with any one of the selector-plates. The several detents are adapted to be actuated by selector-magnets 249, the armature-levers 250 of which are pivoted and normally rest beneath the projecting ends of the several detents; but when any one of said selector-magnets is energized its armature-lever will elevate its respective detent to allow the desired movement of the selector-shaft. As shown in the drawings, the several selector-magnets are arranged in different vertical planes to bring their armatures in line with the several detents. The several detents are normally maintained in their depressed position by springs 251, (see Fig. 1,) carried by the same disks to which the detents are connected. In order to allow for the easy restoration of the selector-shaft, the detents are preferably provided on their extended ends with rounded surfaces 252, which engage corresponding surfaces 253 on the armature-levers, so that if the selector should be restored before one of the armature-levers of the selector-magnets has returned to its normal position the engagement of the rounded surfaces 252 and 253 will immediately depress the armature-lever and allow the detent to be forced by its spring into engagement with its corresponding recess.

Figure 6:
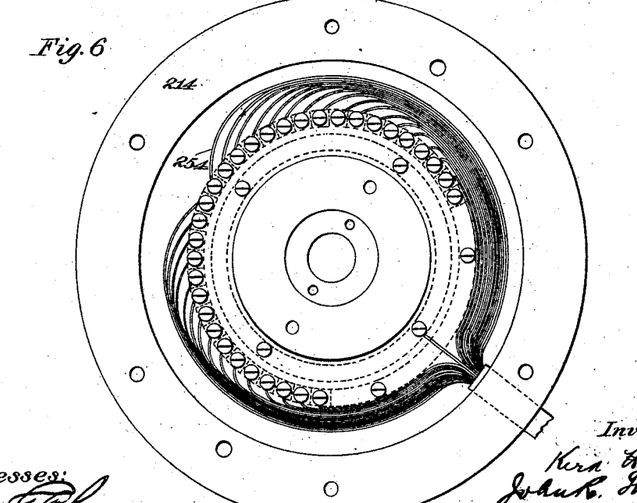
Fig. 6, an under view showing the connections to the selector-plates.
Figure 7:
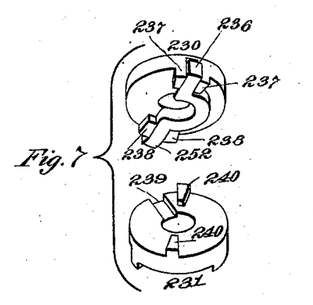
Fig. 7, a perspective view showing the bottom face of the upper disk and the top face of the second disk.
Figure 8:
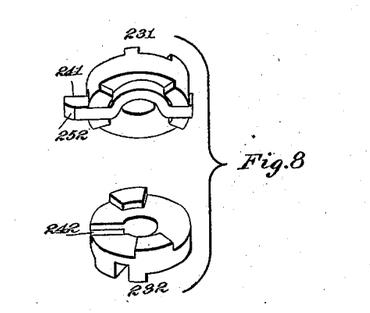
Fig. 8, a similar view showing the bottom face of the second disk and the top face of the third disk.
Figure 9:
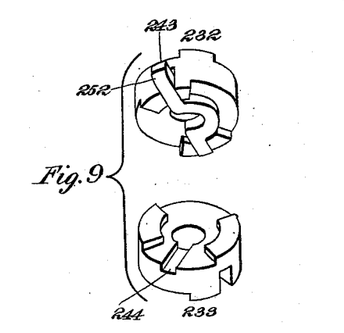
Fig. 9, a similar view showing the bottom face of the third disk and the top face of the fourth disk.
Figure 10:
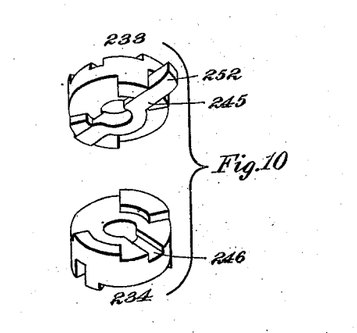
Fig. 10, a similar view showing the bottom face of the fourth disk and the top face of the fifth disk.
Figure 11:
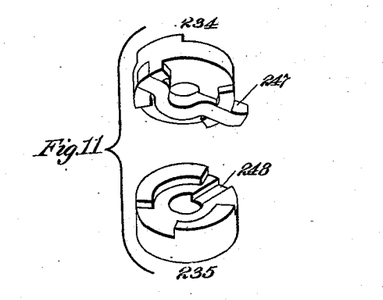
Fig. 11, a similar view showing the bottom face of the fifth disk and the top face of the sixth disk.
Figure 12:
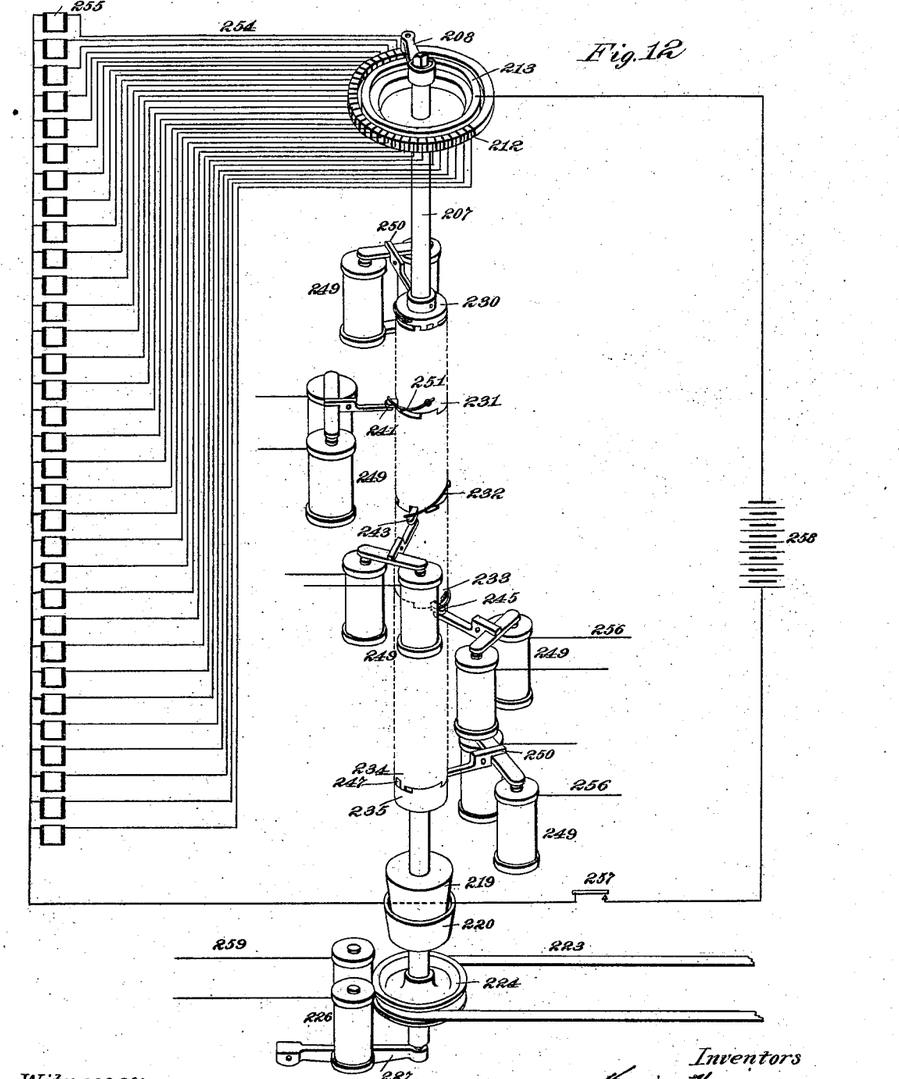
Fig. 12, a diagrammatic view of the main operative parts of the selector, showing circuit connections to thirty-two controlled magnets.

The selector-plates 212 are insulated from each other and are connected with the wires 254, as shown in Fig. 6, such wires being arranged in a channel formed in the insulated disk 214. In Fig. 12 we illustrate each of the selector-plates as being connected to a magnet 255, thirty-two of such magnets being shown and being used for any desired purpose. By energizing any one or more of the selector-magnets the brush 209 will be moved to the desired selector-plate, and by then closing a circuit, including the ring 213 and such selector-plate, the desired magnet will be energized. We illustrate the selector-magnets in separate circuits 256, which extend to any desired form of distributer or each of which is a separate line-circuit or a local circuit controlled by a relay in a separate line-circuit. We also illustrate a circuit-maker 257 in circuit with a local battery 258 and the collecting-ring 213, whereby upon the operation of the circuit-maker 257 the circuit will be closed through the particular selector-plate and magnet with which it is connected. We illustrate the restoring-magnet in a separate circuit 259, operated in any suitable way, but preferably by the distributer immediately following the closure of the printing or controlling circuit.

The operation of our improved selector will be as follows: Normally the clutch for the selector-shaft will be disengaged, the restoring-shaft will be rotating, the brush 209 will be resting upon the first selector-plate, and the selector-shaft will be held from rotation under the tension of the spring 216 by the locking together of the several disks. By now energizing one of the selector-magnets or by successively energizing two or more of such selector-magnets one or more of the detents 236 241 243 245 247 will be elevated to release it from its coöperating recess and allow a relative movement of the released disk or disks to an extent dependent upon the selector magnet or magnets which may have been energized. The release of the disks allows the spring 216 to rapidly move the selector-shaft until the interengaging lugs arrest motion thereof, with the brush 209 bearing upon the desired selector-plate. By any suitable device the circuit will now be closed through the particular selector-plate on which the brush may be resting and will energize its corresponding magnet to accomplish the desired work. After this the restoring-magnet will be energized, attracting its armature-lever 227 and engaging the two sections of the friction-clutch together. This will rotate the restoring-shaft in the opposite direction, placing the spring 216 again under tension and returning the brush until it once again bears upon the first plate, the parts being held in this position by the engagement of the several detents with their coöperating grooves. By interposing a friction connection between the power and the selector shafts the restoring-shaft 221 will be allowed to rotate, notwithstanding the locking of the selector-shaft when it reaches its normal position, but the circuit controlling the restoring-magnet will be so controlled as to be broken as soon as practicable after the restoring-shaft is fully restored, so as to prevent unnecessary wear. We find in practice that our device is susceptible of high speed, and it has been sufficiently tested in actual use as to demonstrate its durability and general efficiency.

It will of course be understood that instead of connecting to the selector-shaft a contact device arranged to make circuit connection with any one of a series of plates, as we describe, it will be possible to operate other electrical or mechanical devices from said selector-shaft. For example, a type-wheel or segment may be mounted directly upon said shaft, any letter thereon being brought into printing position by energizing one or more of the selector-magnets.

Having now described our invention, what we claim as new, and desire to secure by Letters Patent, is as follows:

1. In a selector, the combination with a selector-shaft normally maintained under spring tension, of a series of locking devices maintaining the shaft normally against movement and adapted when operated to allow movement of the selector-shaft to different predetermined extents, a selector-magnet for each of said locking devices, a series of selector-plates, and a contact device carried by the selector-shaft and adapted to make contact with any one of said selector-plates, substantially as set forth.

2. In a selector, the combination with a selector-shaft normally maintained under spring tension, of a series of locking devices maintaining the shaft normally against movement and adapted when operated to allow movement of the selector-shaft to different predetermined extents, a selector-magnet for each of said locking devices, a series of selector-plates, a contact device carried by the selector-shaft and adapted to make contact with any one of said selector-plates, and means to restore the selector-shaft to its normal position to again maintain the same under tension, substantially as set forth.

3. In a selector, the combination with a selector-shaft, of a series of locking devices adapted to lock the shaft normally against movement but when released to permit varying and predetermined extents of movement thereof, a series of selector-magnets for operating said locking devices, a series of selector-plates circumferentially arranged with respect to said shaft, an arm carried by the shaft, a brush adapted to make contact successively with the selector-plates, and a spring for turning the selector-shaft when released by the operation of any one or more of said locking devices, substantially as set forth.

4. In a selector, the combination with a selector-shaft, of a series of locking devices adapted to lock the shaft normally against movement but when released to permit varying and predetermined extents of movement thereof, a series of selector-magnets for operating said locking devices, a series of selector-plates circumferentially arranged with respect to said shaft, an arm carried by the shaft, a brush adapted to make contact successively with the selector-plates, a spring for turning the selector-shaft when released by the operation of any one or more of said locking devices, and means for winding said spring and simultaneously restoring the selector-shaft to its normal position, substantially as set forth.

5. In a selector, the combination with a selector-shaft, of a series of selector-plates, a contact device carried by the selector-shaft and engaging said selector-plates, a series of locking devices carried by the selector-shaft normally locking the same against movement but adapted when operated to permit varying but predetermined extents of movement of said shaft, a series of selector-magnets radially disposed with respect to said shaft for operating said locking devices, a spring connected to said shaft for rotating the same, a continually-rotating restoring-shaft, a clutch between said restoring-shaft and the selector-shaft, and a magnet for operating said restoring-shaft, substantially as set forth.

6. In a selector, the combination with a selector-shaft carrying a device to be controlled, of a series of disks carried by the selector-shaft, a series of detents carried by said disks and engaging recesses in the adjacent disks, interlocking lugs on said disks permitting graduated relative movements thereof, a series of selector-magnets for operating said detents, and means for turning the selector-shaft, substantially as set forth.

7. In a selector, the combination with a selector-shaft, a series of selector-plates and a contact device carried by the selector-shaft and engaging said plates, of a series of disks carried by the selector-shaft, a series of detents carried by said disks and engaging recesses in the adjacent disks, interlocking lugs on said disks permitting graduated relative movements thereof, a series of selector-magnets for operating said detents, and means for turning the selector-shaft, substantially as set forth.

8. In a selector, the combination with a selector-shaft carrying a device to be controlled, of a series of disks carried by the selector-shaft, a series of detents carried by said disks and engaging recesses in the adjacent disks, interlocking lugs on said disks permitting graduated relative movements thereof, a series of selector-magnets arranged radially around the selector-shaft in different vertical planes for operating said detents, and means for turning the selector-shaft, substantially as set forth.

9. In a selector, the combination with a selector-shaft carrying a device to be controlled, of a series of disks carried by the selector-shaft, a series of detents carried by said disks and engaging recesses in the adjacent disks, interlocking lugs on said disks permitting graduated relative movements thereof, a series of selector-magnets for operating said detents, and a spring for turning the selector-shaft, substantially as set forth.

10. The combination with a selector having a series of selector-plates, of a collecting-ring mounted adjacent to said selector-plates, a brush contacting with said collecting-ring and selector-plates and adapted to be engaged with any one of said plates, a series of selector-magnets controlling the position of said brush, a series of controlling-magnets each connected with one of said plates, and a circuit-maker in circuit with the collecting-ring and the controlling-magnets for closing the circuit through any selected magnet, substantially as set forth.

11. In a selector, the combination with a selector-shaft, of a contact device carried by said shaft, a series of selector-plates with which said contact device engages, a spring for turning said shaft and means for positively reversing said shaft to wind said spring, substantially as set forth.

12. In a selector, the combination with a selector-shaft, of a contact device carried by said shaft, a series of selector-plates with which said contact device engages, a spring for turning said shaft, and power connections for positively restoring the selector-shaft to thereby put the spring under tension, substantially as set forth.

This specification signed and witnessed this 7th day of February, 1899.

KIRK HIMROD.
JOHN R. TUCKER.
CHARLES C. HINCKLEY.

Witnesses:
W. J. TYERS,
J. W. TUCKER.